United States Patent
McGee et al.

(10) Patent No.: US 7,066,414 B1
(45) Date of Patent: Jun. 27, 2006

(54) METHOD AND MEANS FOR REDUCING STRESS IN A PIVOT IRRIGATION PIPELINE

(75) Inventors: Ricky D. McGee, Gretna, NE (US); Dale A. Christensen, Arlington, NE (US)

(73) Assignee: Valmont Industries, Inc., Valley, NE (US)

( * ) Notice: Subject to any disclaimer, the term of this patent is extended or adjusted under 35 U.S.C. 154(b) by 204 days.

(21) Appl. No.: 10/776,136

(22) Filed: Feb. 11, 2004

(51) Int. Cl.
*B05B 3/00* (2006.01)

(52) U.S. Cl. ............ 239/728; 239/730; 239/732; 405/36

(58) Field of Classification Search ............ 239/728, 239/730, 731, 732, 733; 405/36, 41, 40
See application file for complete search history.

(56) References Cited

U.S. PATENT DOCUMENTS

| 3,608,826 | A | * | 9/1971 | Reinke | 239/729 |
| 3,936,117 | A | * | 2/1976 | Reinke | 239/728 |
| 4,041,975 | A | * | 8/1977 | Ames | 239/731 |
| 5,435,495 | A | * | 7/1995 | Davis | 239/728 |
| 6,902,351 | B1 | * | 6/2005 | McGee et al. | 405/36 |

* cited by examiner

*Primary Examiner*—David A. Scherbel
*Assistant Examiner*—Jason Boeckmann
(74) *Attorney, Agent, or Firm*—Thomte, Mazour & Niebergall; Dennis L. Thomte

(57) ABSTRACT

A method and means for reducing stress in a pivot irrigation pipeline by permitting the pipeline to be separated from the center pivot structure while maintaining the pipeline in alignment with the center pivot structure. The alignment assembly of this invention facilitates the reconnection of the pipeline to the center pivot structure when the irrigation system is going to be used to irrigate.

11 Claims, 5 Drawing Sheets

METHOD AND MEANS FOR REDUCING STRESS IN A PIVOT IRRIGATION PIPELINE

BACKGROUND OF THE INVENTION

1. Field of the Invention

This invention relates to a method and means for reducing stress in a pivot irrigation pipeline and more particularly to a method and means for reducing stress in a pivot irrigation pipeline by allowing the pipeline to separate while maintaining the same in proper alignment to facilitate reconnection.

2. Description of the Related Art

Center pivot irrigation systems comprise a center pivot structure having an elongated water pipeline extending outwardly therefrom which is supported upon a plurality of spaced-apart drive towers. In many cases, the systems are quite long. During periods of non-use, when cooler temperatures are experienced, the long systems tend to contract which causes stress in the system which may result in component failure. If the pipeline is disconnected from the center pivot structure to reduce the stress in the system during periods of cooler temperatures, it is extremely difficult to align the pipeline with respect to the center pivot structure to reconnect the same.

SUMMARY OF THE INVENTION

A method and means is described for reducing stress in a pivot irrigation system by allowing the pipeline to separate from the center pivot structure during periods of cooler temperatures. The instant invention includes an alignment assembly which is secured to and extends between the center pivot structure and inner end of the pipeline. When the pipeline is disconnected from the center pivot structure and cooler temperatures are experienced, the alignment assembly permits the system to contract along its length and maintains the inner end of the pipeline in alignment with the center pivot structure to facilitate reconnection of the same when the system is going to be used to irrigate.

It is therefore a principal object of the invention to provide a method and means for reducing stress in a pivot irrigation pipeline when cooler temperatures are experienced.

Yet another object of the invention is to provide a method and means for reducing stress in a pivot irrigation pipeline by allowing the pipeline to be separated from the center pivot structure while maintaining the same in alignment to facilitate subsequent reconnection.

Yet another object of the invention is to provide a novel method and means for reducing stress in a pipeline which may be easily retrofitted onto existing systems.

These and other objects will be apparent to those skilled in the art.

DETAILED DESCRIPTION OF THE INVENTION

Figure 1:
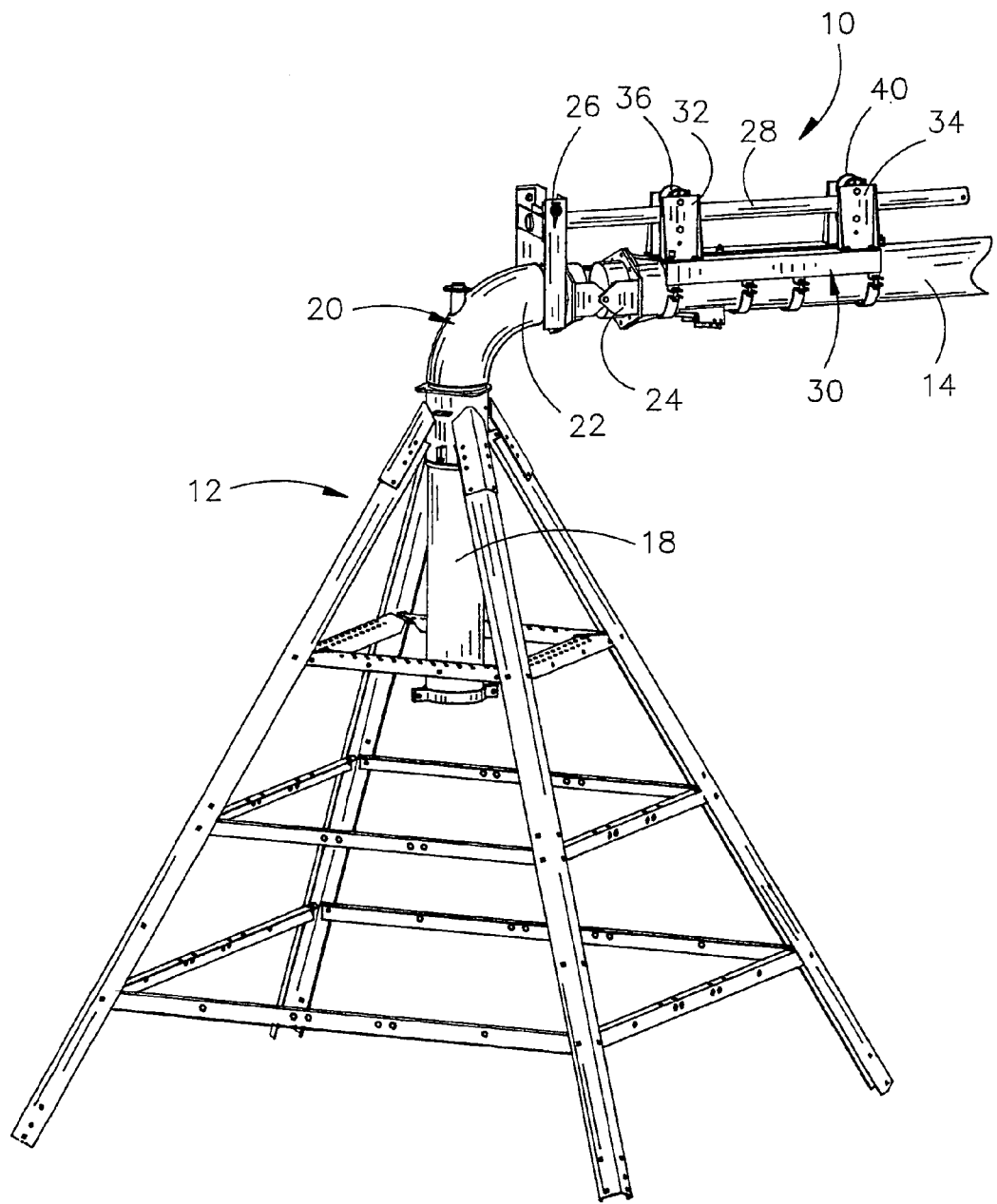
FIG. 1 is a perspective view of the apparatus of this invention.

In FIG. 1, the numeral 10 refers generally to a prior art self-propelled pivot irrigation system including a center pivot structure 12 and an elongated water pipeline or boom 14 supported upon a plurality of spaced-apart drive towers 16 in conventional fashion. Pivot structure 12 includes a vertically disposed pipe 18 which is in communication with a source of water. Normally, pipe 18 is provided with an elbow 20 at its upper end to define a horizontally extending pipe portion 22. Elbow 20 is rotatably secured, about a vertical axis, to the pipe 18 in conventional fashion. In most cases, pipe portion 22 has a flex joint assembly 24 at its outer end which connects the pipe portion 22 to the inner end of the pipeline 14 in a manner which permits the pipeline 14 to flex with respect to the pipe portion 22 as the system moves around the area being irrigated.

Figure 2:
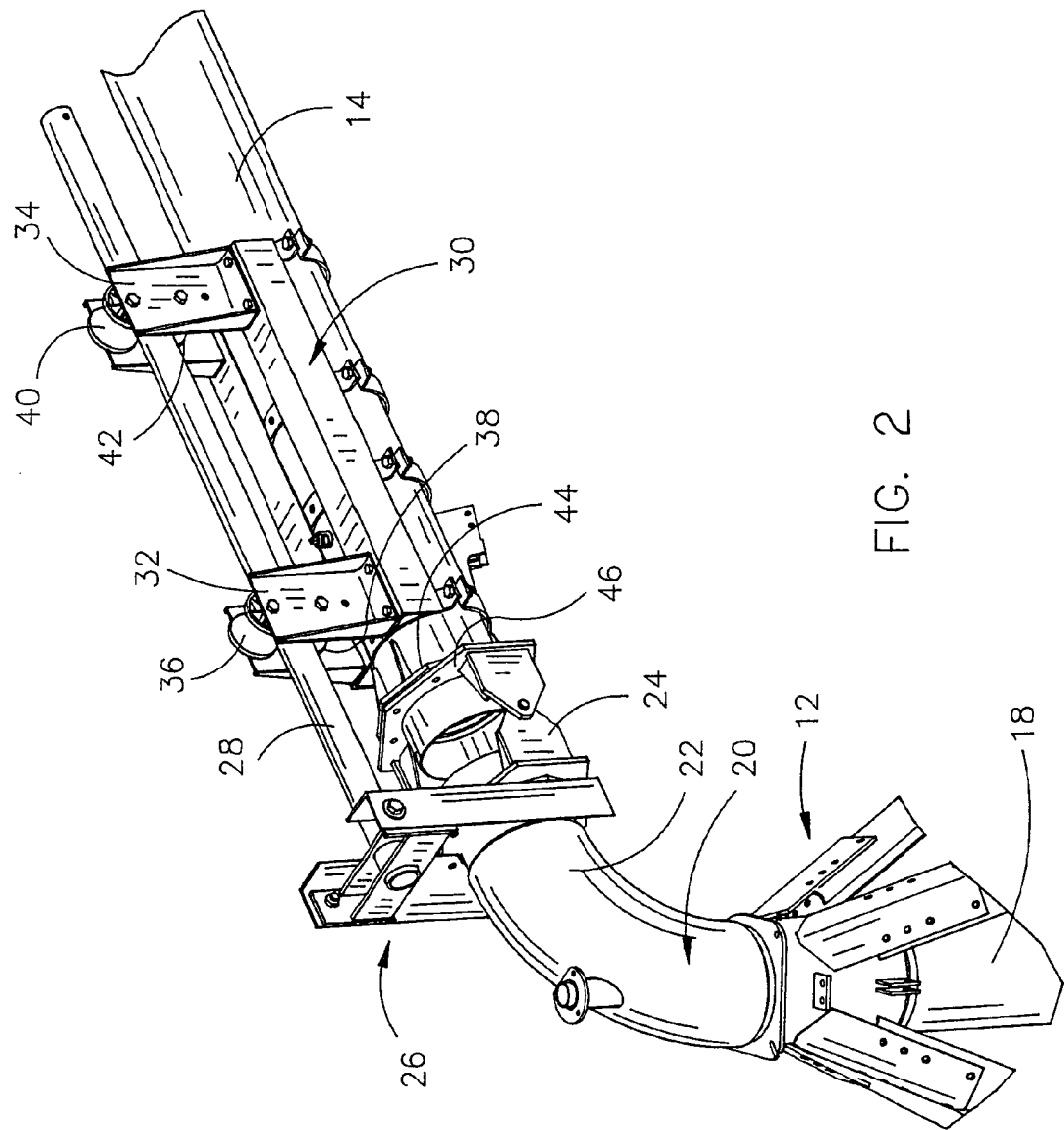
FIG. 2 is a perspective view of the apparatus of this invention.

In the instant invention, as shown in FIGS. 1–4, an upstanding support 26 is bolted to the inner flange of the flex joint assembly 24 and extends upwardly therefrom. An elongated pivot tube or rod 28 is secured to the upper end of the support 26 and extends therefrom over the inner end of the pipeline 14 (FIG. 2). Support 30 is clamped or otherwise secured to the inner end of the pipeline 14 and has a pair of upstanding brackets 32 and 34 secured thereto. Bracket 32 has upper and lower rollers 36 and 38 rotatably mounted thereon which receive the rod 28 therebetween. Similarly, bracket 34 has upper and lower rollers 40 and 42 rotatably mounted thereon which receive the rod 28 therebetween. In normal use, the flange 44 on the inner end of pipeline 14 is bolted to the flange 46 on the outer end of the flex joint 24.

Figure 3:
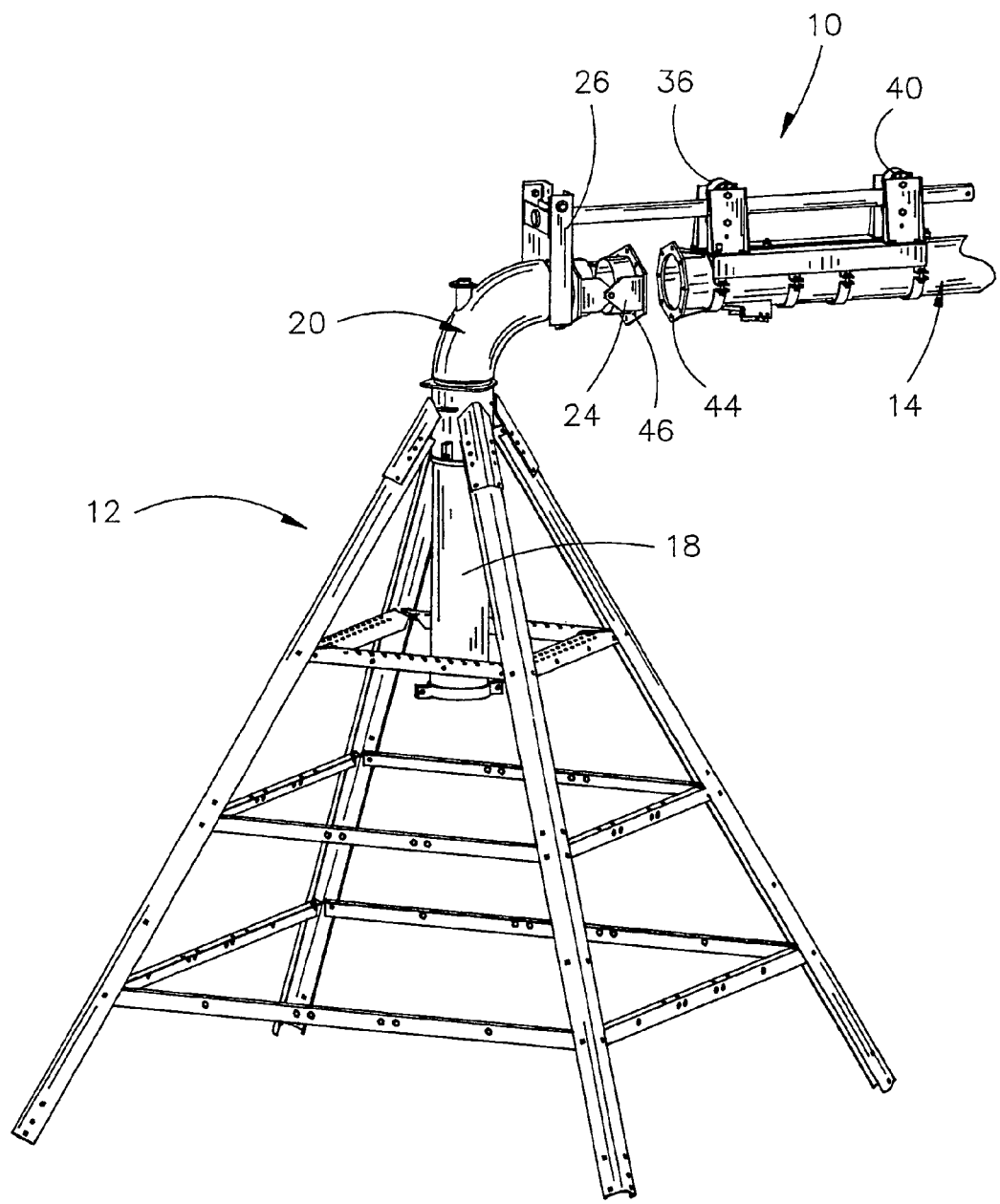
FIG. 3 is a view similar to FIG. 1 except that the pipeline has been disconnected from the center pivot structure and the pipeline has moved away from the center pivot structure.
Figure 4:
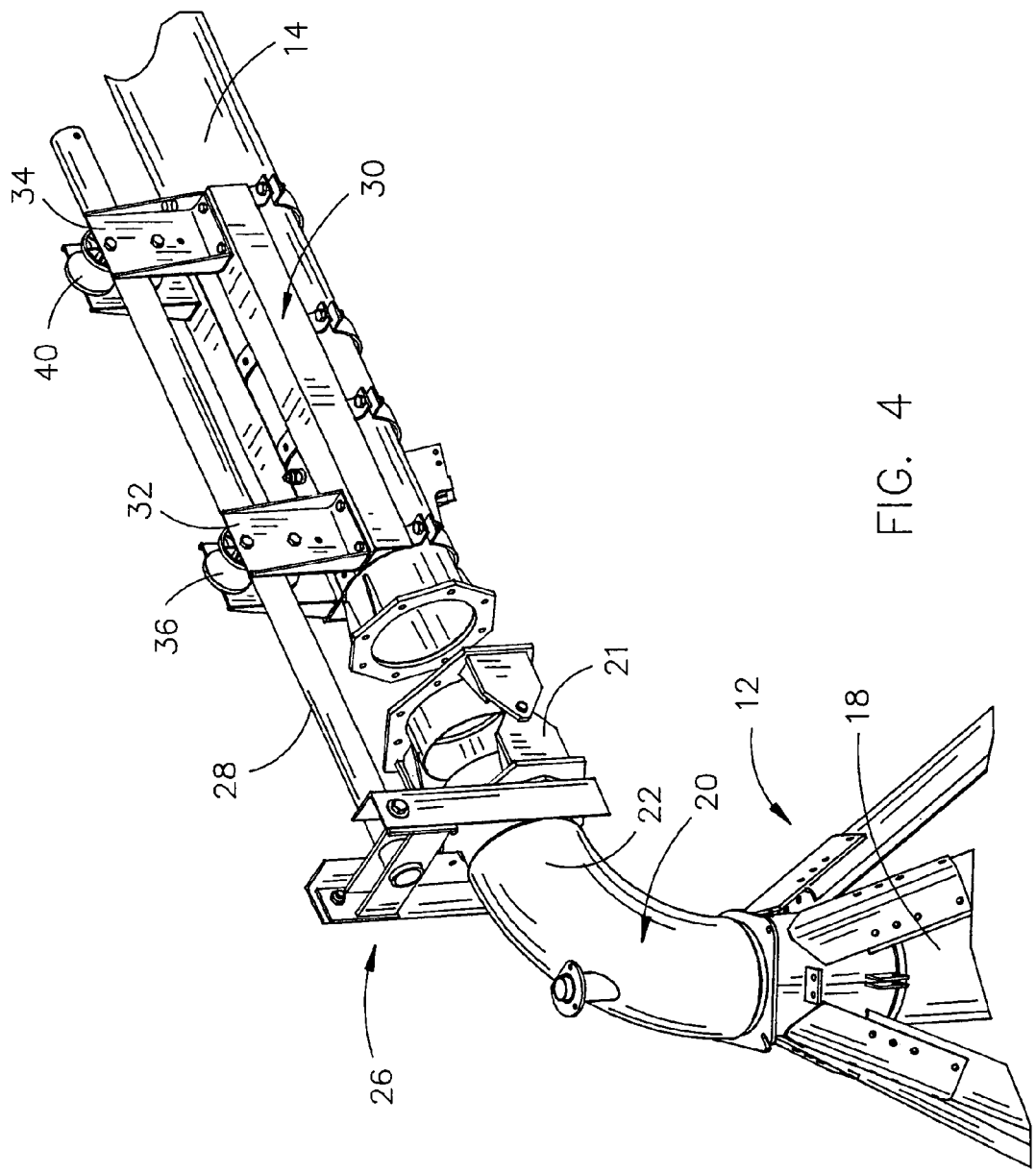
FIG. 4 is a view similar to FIG. 2.
Figure 5:
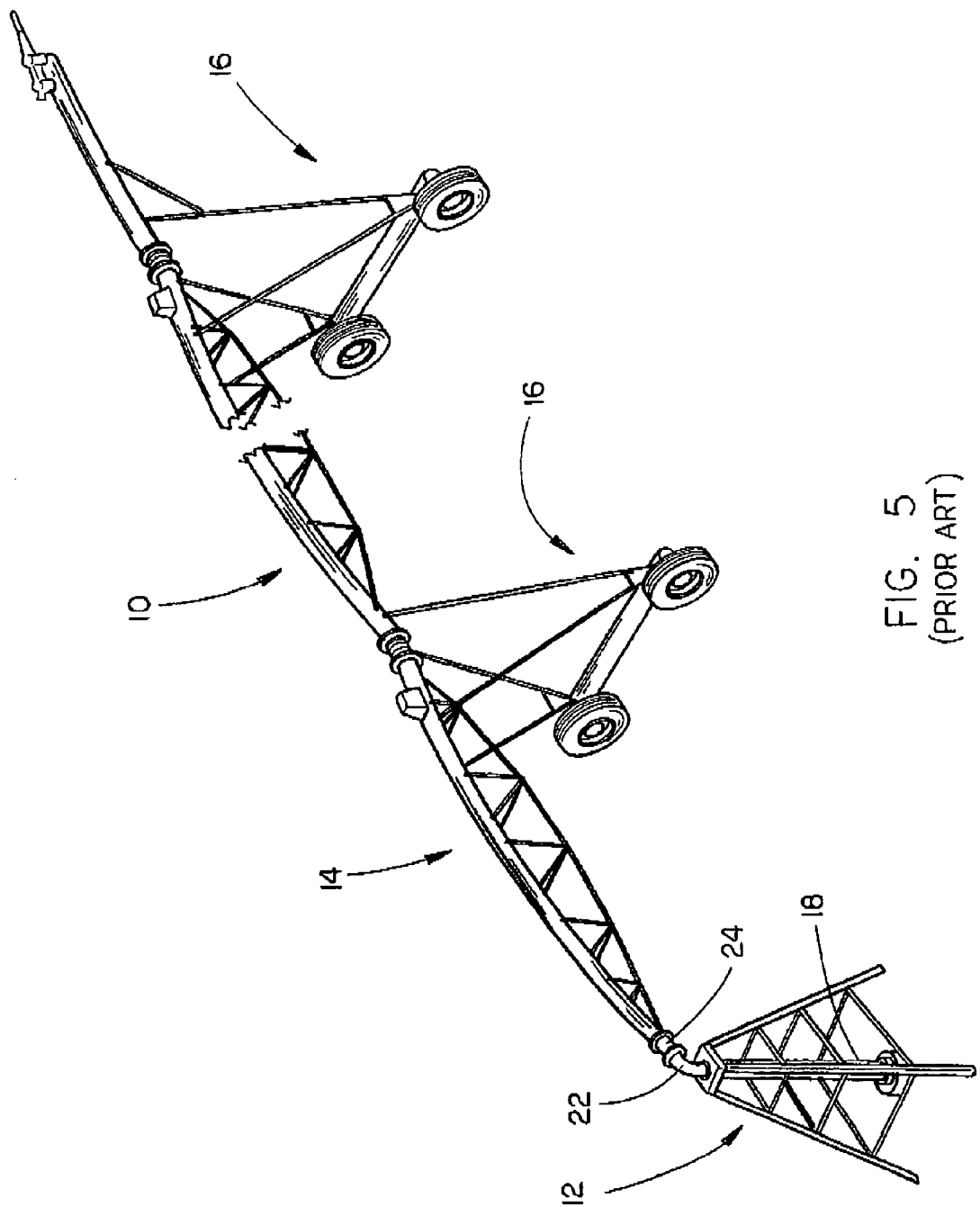
FIG. 5 is a perspective view of a prior art center divot irrigation machine.

If the flanges 44 and 46 remain connected during periods of cooler weather, contraction of the system may cause stress in the machine resulting in possible component failure. The instant invention permits the inner end of the pipeline 14 to be disconnected from the pivot structure 12 during periods of cooler temperatures while permitting the pipeline 14 to be easily reconnected to the pivot structure when the machine is going to be used to irrigate. If cooler weather is anticipated, the flanges 44 and 46 are disconnected (FIG. 3). As the machine contracts due to the cooler temperatures, the invention allows the system to move linearly along its length. As the system moves linearly along its length, the interaction of the rod 28 with the rollers on the brackets 32 and 34 maintains the inner end of the pipeline 14 in alignment with the pipe portion 22 (FIGS. 3, 4). As temperatures increase, the machine moves linearly along its length so that the inner end of the pipeline 14 moves into registering alignment with the outer end of the flex joint 24 which facilitates the reconnection of the flanges 44 and 46. If a space exists between the flanges 44 and 46, a "come-a-long" or similar tool may be used to manually bring the flanges 44 and 46 together to reconnect the same.

Thus it can be seen that the invention provides a method and means for reducing the stress in an irrigation system during periods of cooler temperatures thereby preventing component failures in the system. The instant invention therefore accomplishes at least all of its stated objectives

We claim:

1. The method of reducing stress in a center pivot irrigation system during a period of time that the system is not functioning and is experiencing cooler temperatures with the system having:

a) a pivot support assembly including a horizontally extending pipe portion;

b) an elongated irrigation pipeline, having inner and outer ends, supported upon a plurality of spaced-apart drive towers;
c) the inner end of the pipeline being fluidly connected to the horizontally extending pipe portion of the pivot support assembly;
comprising the following steps:
d) fluidly disconnecting the inner end of the pipeline from the horizontally extending pipe portion of the pivot support assembly;
e) maintaining the inner end of the pipeline in alignment with the horizontally extending pipe portion of the pivot support assembly during the time that the inner end of the pipeline is disconnected from the horizontally extending pipe portion of the pivot support assembly to facilitate the fluid reconnection of the inner end of the pipeline to the horizontally extending pipe portion of the pivot support assembly when the system is going to be used to irrigate.

2. The method of claim 1 wherein a support assembly is secured to and extends between the horizontally extending pipe portion and the inner end of the pipeline.

3. The method of claim 1 wherein a flex joint is provided on said horizontally extending pipe portion.

4. The method of reducing stress in a center pivot infringement irrigation system during a period of time that the system will not be operating having:
a) a pivot support assembly including an upstanding pipe connected to a source of water;
b) a horizontally extending pipe portion at the upper end of the upstanding pipe which is in fluid communication therewith;
c) an elongated irrigation pipeline supported upon a plurality of spaced-apart driver towers and having inner and outer ends;
d) the inner end of the pipeline being fluidly connected to the horizontally extending pipe portion;
comprising the following steps:
e) fluidly disconnecting the inner end of the pipeline from the horizontally extending pipe portion;
f) maintaining the inner end of the pipeline in alignment with the horizontally extending pipe portion during the time that the inner end of the pipeline is disconnected from the horizontally extending pipe portion of the pivot support assembly to ease the fluid reconnection of the inner end of the pipeline to the horizontally extending pipe portion.

5. The method of claim 4 wherein a support assembly is secured to and extends between the horizontally extending pipe portion and the inner end of the pipeline.

6. The method of claim 4 wherein a flex joint is provided on said horizontally extending pipe portion.

7. An irrigation system, comprising:
a pivot support structure;
an elongated irrigation pipeline supported upon a plurality of spaced-apart driver towers;
said pipeline having inner and outer ends;
said pivot support structure including a generally vertically disposed pipe fluidly connected to a source of water, and a horizontally extending pipe portion at the upper end of said generally vertically disposed pipe;
said inner end of said pipeline being fluidly connected to said horizontally extending pipe portion;
a disconnect alignment assembly operatively secured to and extending between said horizontally extending pipe portion and said inner end of said pipeline;
said disconnect alignment assembly adapted to maintain said inner end of said pipeline in alignment with said pipe portion when said inner end of said pipeline is fluidly disconnected from said horizontally extending pipe portion to reduce stress in the system during the time that the inner end of the pipeline is disconnected from the horizontally extending pipe portion of the pivot support assembly to facilitate the subsequent reconnection of the inner end of the pipeline to the horizontally extending pipe portion when the system is going to be used to irrigate.

8. The irrigation system of claim 7 wherein a flex joint is operatively secured to said pipe portion.

9. The irrigation system of claim 7 wherein said disconnect alignment assembly comprises:
(a) a first support means secured to said horizontally extending pipe portion;
(b) an elongated member having inner and outer ends, said inner end of said elongated member being secured to said first support;
(c) a second support means on said inner end of said pipeline;
(d) said second support means movably receiving said elongated member.

10. An irrigation system, comprising:
a pivot support structure;
an elongated irrigation pipeline supported upon a plurality of spaced-apart driver towers;
said pipeline having inner and outer ends;
said pivot support structure including a generally vertically disposed pipe fluidly connected to a source of water, and a horizontally extending pipe portion at the upper end of said generally vertically disposed pipe;
said inner end of said pipeline being fluidly connected to said horizontally extending pipe portion;
a disconnect alignment assembly operatively secured to and extending between said horizontally extending pipe portion and said inner end of said pipeline;
said disconnect alignment assembly comprising:
(a) a first support means secured to said horizontally extending pipe portion;
(b) an elongated member having inner and outer ends, said inner end of said elongated member being secured to said first support;
(c) a second support means on said inner end of said pipeline;
(d) said second support means movably receiving said elongated member;
said second support means including a pair of horizontally spaced-apart support members; each of said support members having upper and lower rollers mounted thereon; said elongated member being movably received between said upper and lower rollers on said support members.

11. The irrigation system of claim 10 wherein said second support means is removably clamped onto said inner end of said pipeline.

* * * * *